P. HOGG.
STEAM TRAP.
No. 47,304. Patented Apr. 18, 1865.
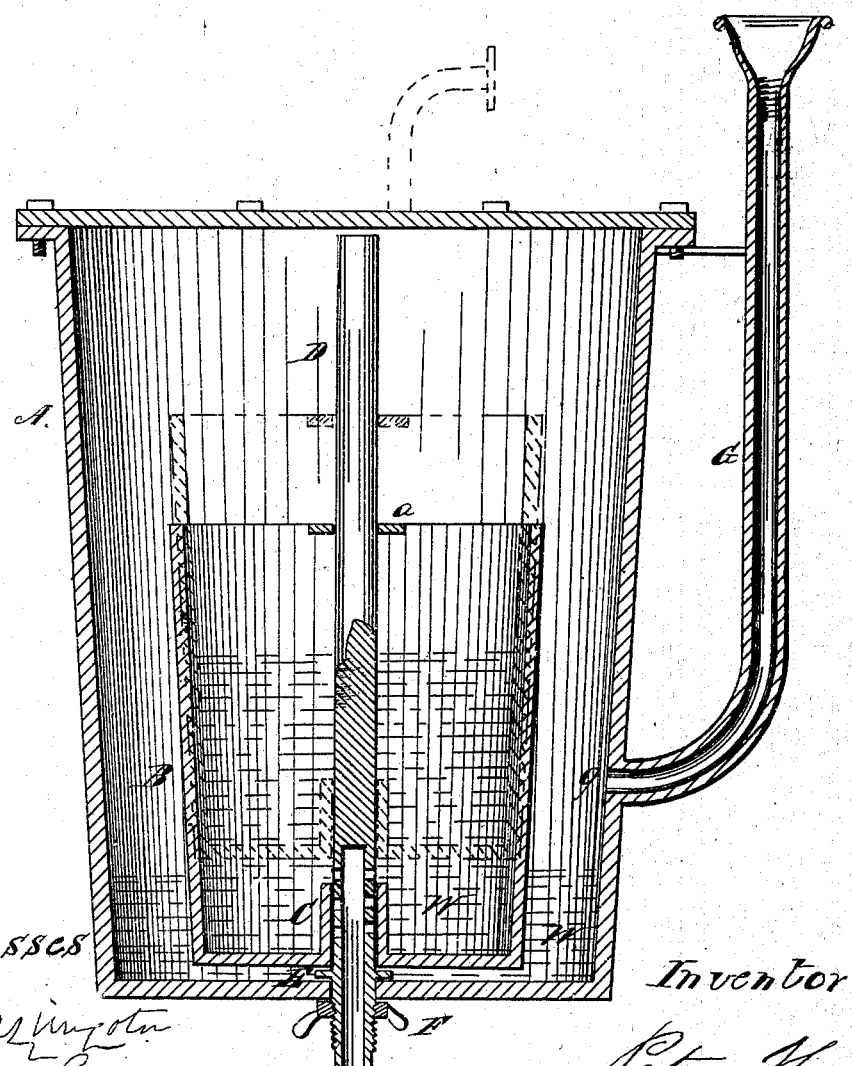
Witnesses
Inventor:
Peter Hogg

UNITED STATES PATENT OFFICE.

PETER HOGG, OF NEW YORK, N. Y.

IMPROVEMENT IN STEAM-TRAPS.

Specification forming part of Letters Patent No. 47,304, dated April 18, 1865.

*To all whom it may concern:*

Be it known that I, PETER HOGG, of the city, county, and State of New York, have invented a new and Improved Steam-Trap; and I do hereby declare that the following is a full, clear, and exact description of the same, reference being had to the accompanying drawing, forming a part of this specification, said drawing representing a sectional elevation through the center of my improved trap.

My object in this invention has been to make a steam-trap for the discharge of the water of condensation from steam pipes and vessels, which shall be automatic under all circumstances, and of the utmost simplicity in its construction.

The water of condensation is received in a tight metallic casing, through the bottom of which is passed a pipe closed at its top and perforated with a series of holes at a small distance above the bottom of the casing. An open vessel in shape like an ordinary pail, but having a collar fitted around and extending a short distance above an opening through the center of its bottom, fits over the pipe, and its collar acts as a movable valve-seat to the perforations in the pipe. This collar or valve-seat covers the holes when the float is at rest and uncovers them when it is in motion, so as to discharge the water. When the pressure of the water in the casing raises the floating pail, it uncovers the lower holes in the discharge-pipe, so as to discharge the water from the casing, and when water has accumulated in the pail so as to carry its collar or valve-seat below the upper holes of the pipe, then this water is also emptied into the pipe and the float is restored to its place so as it will close all the holes in the pipe.

To enable those who are skilled in this branch of mechanics to understand and construct my invention, I will proceed to describe it more fully.

A is a metallic casing, within which the other parts of the trap are inclosed. When the trap is ready for use, this casing is to be closed steam and water tight. A pipe, G, is here shown connecting the trap with the steam-pipes or other apparatus which are to be cleared of the water of condensation, the pipe entering the casing at or near a point, $g$, or at any other point on its sides or on its top. The trap may receive water of condensation from more than one source by means of additional pipes, and the pipe or pipes, which, as indicated in red outline, enter the trap through its top, will discharge themselves into the open pail beneath. The pipe D, which is closed at top, passes through the bottom of the casing and is supported by its flange E, which rests upon the bottom of the casing and is secured in position by the nut F, working on a screw-thread on the pipe and turned up snugly against the under side of the casing, thus clamping it between the flange of the pipe and the nut. An open vessel or pail, B, is fitted around the pipe D by means of a hole through its bottom. A guide-piece, O, across the mouth of the pail through which the pipe passes, acts as a guide to the pail in its movements. The pipe D is perforated around its circumference at a suitable height above its flange E with a series of holes for the discharge of the water of condensation, which then passes through the pipe into any suitable receptacle, or these holes may be on opposite sides of the pipe, in which case those on each side should be equal in number, after the example of my invention herein shown, where four holes are placed on each side and opposite to each other to secure an equilibrium of pressure upon the float or pail in its movements. A collar, C, is secured within and above the opening in the bottom of the pail B, and which is of such length as to cover that part of the pipe which is perforated, thus doing the work of a valve.

The operation is as follows: The water of condensation accumulates in the casing A until its pressure floats the pail B. When the pail rises above one or more of the holes in the pipe, a discharge of water takes place, which continues until the weight of the pail brings its collar down over the holes again.

It is found in practice that water which is formed from condensation which takes place in the trap itself will accumulate in the pail until its increasing weight brings the upper edge of the collar below one or more of the holes in the pipe, when its contents will be discharged down to the level of the height of the collar. So soon as the equilibrium is restored between the weight of the water W in the pail and the pressure of that in the casing A and pipe G, the pail will resume its normal position and will close the holes in the pipe D.

It results from this construction and operation that any change in the position of the pail B will uncover one or more of the perforations in the pipe D. If the pail is carried downward by the weight of water in itself, then the top of its collar $c$ is brought below the uppermost of said perforations and the water escapes through the pipe; or if the pail is carried upward, then the lowermost perforations are exposed to the water in the casing.

The cup in the bottom of the pail will serve to hold any foreign matter, scales of rust, &c., which might otherwise reach the pipe and obstruct the discharge.

What I claim in the construction of steam-traps is—

1. The open-mouthed float, with its valve-collar, or their equivalents, in combination with the perforated pipe D, substantially as described.

2. The use in steam-traps of an open-mouthed float, which opens and closes the orifices for the discharge of water from the trap, substantially as described.

3. The combination of the float, constructed substantially as shown, with the discharge-pipe D, the casing A, and the connecting-pipe G, substantially as shown.

PETER HOGG.

Witnesses:
M. M. LIVINGSTON,
C. L. TOPLIFF.